Oct. 10, 1961  E. R. MILLER  3,004,130
TANK HEATING SYSTEM
Filed Nov. 12, 1959  2 Sheets-Sheet 1

INVENTOR
ELDON R. MILLER

ATTORNEY

United States Patent Office 3,004,130
Patented Oct. 10, 1961

3,004,130
TANK HEATING SYSTEM
Eldon R. Miller, Iowa City, Iowa, assignor to
Eldon Miller, Inc., a corporation of Iowa
Filed Nov. 12, 1959, Ser. No. 852,469
5 Claims. (Cl. 219—20)

This invention relates to heating systems for tanks and particularly to an improved heating system for maintaining the temperature within the tank of a vehicle at any predetermined desired value.

In transporting commodities in tanks, which may be hauled over highways by trucks, over railways as parts of tank cars, or otherwise transported, it is often desirable that the commodity be kept at a predetermined temperature in order to assist in its preservation, to prevent chemical changes therein, or to prevent it from solidifying within the tank.

In addition, where a relatively hot liquid is to be placed in a tank, it often is desirable that the tank should be preheated to prevent shock to the tank from sudden expansion when the hot substance comes in contact with the tank surface. Such a preheating will prevent excessively rapid expansion of the tank and thereby prevent buckling or loosening of different parts of the tank. In addition, cleaning of the interior of a tank also may be facilitated by heating the shell, so that material within the tank will be more liquid and therefore more easily removable.

In some instances, vehicles may be stored or parked for a period of time with commodities in the tank, and it may be desirable that the commodity should be kept at a predetermined temperature during such stoppages in transit. This is greatly facilitated where a built-in heating system forms part of the tank structure as it eliminates the necessity of placing the tank in a building which is maintained at the desired temperature. Furthermore, in many instances it is desirable that the commodity transported in a tank should have a predetermined temperature or a desired fluidity, which is obtainable only at a given temperature, when the commodity is being delivered at its destination. A heated tank may thus provide the added advantage of having the commodity at a temperature which permits its immediate use on delivery.

Various types of heating systems have been proposed for regulating the temperature of vehicle tanks, but these systems generally have been dependent upon the operation of the vehicle or its source of motive power, so that the tank could not be maintained at the desired temperature unless the main source of motive power was in operation. In addition, many proposed heating systems for vehicle tanks have not provided for a substantially uniform heating of the entire tank, so that certain parts of the tank would be heated to a considerably higher temperature adjacent to the heating elements than other parts of the tank, and no provision was made for keeping the general mass of the commodity at a substantially uniform temperature.

In other proposed vehicle tank heating systems, it was considered desirable to place the heating elements in relatively intimate contact with the commodity in the tank in order to increase the efficiency of the heat transfer between the heating elements and the commodity. This type of heating system has presented problems in cleaning the interior of the tank in order to prevent contamination of different commodities which might be transported at different times in the same tank. In order to avoid the undesirable properties of this latter type of heating system, it has been proposed to arrange the heating elements around the exterior surface of certain parts of the tanks, so that they would not interfere with the smooth interior of the tanks. This type of heating system generally has been provided with a thermal shield which aids in directing the heat from the heating element to the tank and minimizes the dissipation of the heat to the ambient by providing an insulating covering over the heating elements. Such a system has the disadvantage of substantially adding to the weight of the vehicle and thereby decreasing its load carrying capacity. In addition, this latter system has the disadvantage of making it difficult to reach the parts of the heating system if repairs or adjustment must be made.

The present improved heating system is adapted to provide substantially uniform heating within a vehicle tank by arranging a plurality of electrical resistance heating elements in close proximity to and evenly around the outer surface of the tank body. These heating elements are energized from an independent source of electrical power supply, and control means are provided for connecting the source of electrical power to the heating elements to maintain the temperature within the tank at a regulatable predetermined temperature, with means for indicaing whether the heating elements are energized or deenergized. In addition, various detailed improvements are provided to increase the efficiency of the operation and control of the heating system and to facilitate inspection and repairs thereof without interfering with any of the conventional facilities provided by such vehicle tanks. The construction is equally useful with road, rail, or other vehicles.

It is an object of the present invention to provide an improved vehicle tank heating system.

Another object of this invention is to provide an improved vehicle tank heating system wherein the temperature within the tank may be varied and maintained at any predetermined desired value.

A further object of this invention is to provide an improved heating system for a vehicle tank which permits the maintenance of a desired tank temperature independently of the operation of the motive power for transporting the tank.

Still another object of this invention is to provide an improved vehicle tank heating system in which none of the parts interferes with the interior surface of the tank and thereby facilitates a proper cleansing of the interior of the tank, which is constructed around the tank to provide a substantially uniform heating of the tank shell, and which is arranged to provide for ready inspection and repair of the various elements comprising the heating system.

A still further object of the present invention is to provide a vehicle tank heating system which can be readily preheated to any predetermined desired temperature and which can maintain the temperature within the tank at the desired temperature during the transportation of a commodity in the tank by a system which is completely portable and self-contained.

Further objects and advantages of this invention will become apparent from the following description referring to the accompanying drawings, and the features of novelty which characterize this invention will be pointed out with particularity in the claims appended to and forming a part of this specification.

Figure 1:
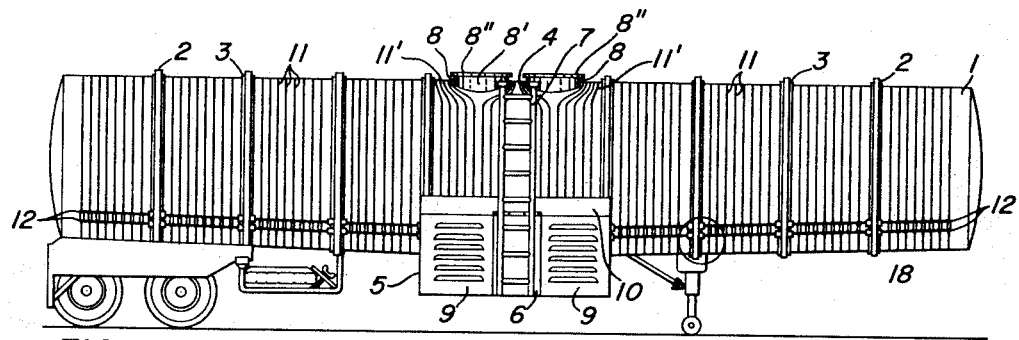
FIG. 1 is a side elevational view of a tank truck trailer provided with a heating system incorporating an embodiment of the present invention.
Figure 5:
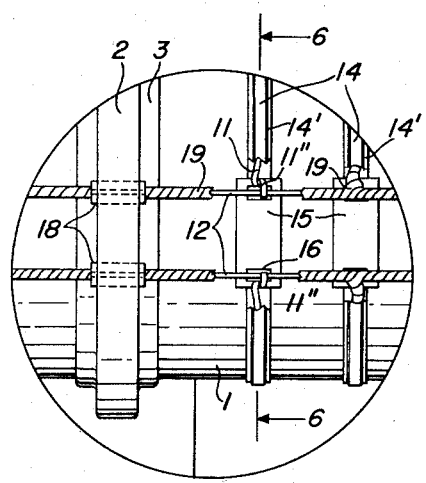
FIG. 5 is an enlarged view of the section shown in a circle in FIG. 1, partly broken away to show the electrical and mechanical connections of the heating elements and their mounting on the tank.
Figure 6:
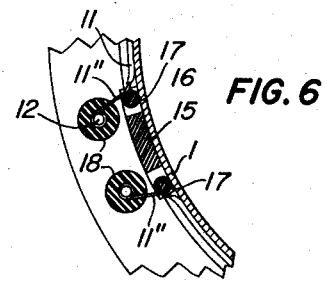
FIG. 6 is a sectional view taken along line 6—6 of FIG. 5 to show further details of the electrical and mechanical connections of the heating elements and their mounting relative to the tank.

Referring to the drawings, an improved vehicle tank heating system incorporating the present invention is shown, for illustrative purposes, applied to a truck trailer tank body 1. Such a heating system can equally well be advantageously used with a railway car or any other vehicle body. In most instances, the tank body will be formed of a plurality of bays, which have structural reinforcing members 2 adjacent to the longitudinal edges thereof. As shown in FIGS. 1, 5, and 6, these reinforcing members may comprise a reinforcing ring which completely surrounds the adjacent juncture edges of adjacent bays for reinforcing and connecting together these adjacent edges of the bays. Any suitable means for connecting together the adjacent edges may be utilized and, in a tank body structure such as that shown in FIG. 1, the adjacent edges of adjacent bays preferably are welded together and welded to an inner web portion 3 of the reinforcing members 2. In this manner, a substantially smooth continuous surface can be provided to the interior of the tank. This facilitates draining and cleaning of the tank and also provides for a more uniform expansion and contraction of the tank under varying temperature conditions, thereby minimizing the shock effects which might otherwise occur when fluids are introduced into the tank which are substantially different in temperature from the temperature of the tank.

Furthermore, it is quite usual for vehicle tank bodies of any substantial size to be constructed of a plurality of compartments, so that the different compartments can be filled and drained separately, or, if desired, can be used to transport different commodities, or different grades of the same commodity in the same load to the same consignee. This provides the added convenience of being able to transport commodities in the different sections of a tank body which are to be delivered to different destinations. The tank body 1 may conveniently be divided into a plurality of compartments by a transversely extending wall 4, which is hermetically sealed to the inner surface of the tank, as by completely welding its peripheral edge to the interior of the tank.

Tank bodies which are formed of a plurality of compartments, such as the one shown in FIG. 1, preferably have all of the control units which are associated with the tank body duplicated for each section of the tank. This provides a convenient way for individually utilizing each section. In order to provide a neater and more compact appearance to the auxiliary equipment required for controlling the heating equipment of a system incorporating the present invention and in order to facilitate adjustment and repairs of such equipment, it preferably is arranged entirely within a single container or housing. This housing may conveniently be in the form of a cabinet 5 attached to one side of the vehicle tank body, preferably substantially at the central part thereof.

As shown in FIG. 1, the cabinet 5 may conveniently be formed with a central detachably secured panel cover 6. This central panel may conveniently be arranged under the lower part of a ladder 7, which extends over the side of the tank body to the upper portion thereof to provide ready access to a manhole 8 opening into each of the compartments of the tank body on opposite sides of the transverse inner wall 4. The panel cover 6 is secured to the cabinet 5 in any suitable manner, as by bolts, and swinging doors 9 preferably are used to close the cabinet 5 on each side of the panel cover 6. These doors may be of any suitable type and preferably are hinged along their upper edges to a cover 10 of the cabinet 5.

Figure 2:
FIG. 2 is a sectional view through a heating element attached to the shell of the vehicle tank shown in FIG. 1.

In order to provide the desired relatively uniform heating of the tank body, a plurality of electrical resistance heating elements 11 is arranged around the tank body, and preferably a plurality of these is arranged substantially equally spaced apart between the reinforcing members 2 of each bay. As shown in FIGS. 1 and 2, these resistance elements may comprise relatively high resistance electrical conductors, such as a Nichrome strip or ribbon, which might be ⅛ inch wide by .0201 inch thick, or 3/16 inch wide by .0126 inch thick. These are conventional sizes of Nichrome conductors which are readily available, and such strip heating elements could conveniently be arranged in about eight loops, as shown in FIG. 1, between each reinforcing ring 2 and connected electrically in parallel to suitable bus lines 12 arranged to extend longitudinally along the side of the tank body 1.

In conventional vehicle tank bodies such as that shown in FIG. 1, manholes 8 are provided with collars 8' which extend around the manholes and are normally closed with manhole covers 8". These manhole collars and covers project outwardly from the periphery of the tank body 1, and, when the vehicle is in motion, tend to act as radiators which dissipate heat much more rapidly than the remainder of the tank body surface. In order to minimize the extra cooling effect of the manhole collars and covers, the heating elements 11 in the bays provided with manholes 8 extend around the manhole collars 8' in relatively closely spaced relationship, as shown at 11'. This provides an increase in the heat generated over the surface of the tank body adjacent to the manhole collars, which tends to maintain the temperature of the commodity in the tank adjacent to the manholes at substantially the same temperature as that in the remainder of the tank. In addition, by so arranging the resistance elements 11 in the bays provided with manholes, these resistance elements are kept at substantially the same length as the resistance elements in the other bays around the tank body, thereby making it possible to use the same size resistance element strip throughout the installation.

In order to obtain a maximum distribution of the heat generated in the electrical heating elements 11, these elements preferably are wrapped in close proximity around the outer surface of the tank body and are insulated from the tank body in any suitable manner, as by a suitable insulating tape 13, which is tightly wrapped around the outside of the tank body 1. The heating element resistance strip 11 then is tightly wrapped around the tape 13 substantially centrally thereof, with the wide side of the strip 11 in contact with the tape 13 so as to provide a maximum contact between the resistance strip 11 and the tape 13, whereby a maximum heat conductive path is provided between the heating element strip, the tape 13, and the tank body 1. As shown in detail in FIG. 2, another layer of insulating tape 14 is wrapped around the outer side of the heating element strip 11, and the outer edges 14' of this insulating tape 14 are tightly pressed into engagement with the outer exposed surface of the tape 13 so as to cause the adjacent surfaces of the tapes 13 and 14 to adhere to each other.

The insulating tapes 13 and 14 may conveniently comprise any suitable heat resistant thermosetting resin tape, which will be adhesive when cold and which will be thermosetting so as to provide a good union between the outer edges 14' of the outer layer of tape 14 and the adjacent portions of the inner layer of tape 13. This thermosetting of the tape will result from the energization of the heating elements 11, so that no additional heat treatment is required after the heating elements have been assembled around the tank body 1.

Figure 7:
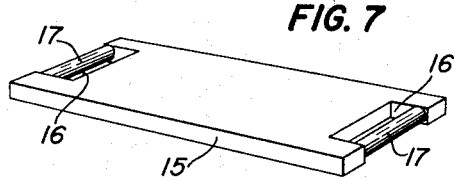
FIG. 7 is a perspective view of an insulating block shown in FIGS. 5 and 6.

In order to secure the heating elements 11 in position around the tank body and to provide for insulating the ends of the heating elements and for the ready connection thereof to the bus lines 12, the end portions 11″ of the heating elements are secured to opposite sides of an insulating block 15. This insulating block 15 preferably is formed with an opening 16 adjacent each end thereof which provides a transversely extending fastening bar 17 at each end of the block 15. As is more clearly shown in FIGS. 6 and 7, the bars 17 preferably are circular in cross-section and formed integrally with the body of the block 15. These blocks 15 are arranged over the inner layer of insulating tape 13 and are of a length so as to span the distance between the bus lines 12. The end portions 11″ of the heating elements 11 extend through the block openings 16 and are wrapped around the insulating block 17, as shown in detail in FIGS. 5 and 6. This securely fastens the heating elements around the tank body 1 in snug engagement with the inner insulating tape 13 and also secures the insulating blocks 15 in position under the bus lines 12. The terminals of the end portions 11″ of the heating elements 11 are electrically connected to the bus lines 12 preferably by turning these terminals around the bare bus lines 12 and silver brazing these terminals to the bus lines 12.

The bus lines 12 preferably are secured in position on the sides of the tank body by extending longitudinally through the reinforcing members 2 and are insulated therefrom by electrically insulating tubes 18, which may be press-fitted into openings in the reinforcing members. All of the exposed parts of the heating elements 11 which extend around the bars 17 of the insulating block 15 and of the exposed parts of the bus lines 12 are insulated in any suitable manner, as by a wrapping of thermosetting insulating tape 19. This tape 19 will form a cohesive insulating layer around the bus lines and its connections to the heating elements which will provide the desired electrical protection of these members of the heating system from weathering elements and also protect these parts against damage from contact with articles during normal usage of the tank. It also provides a protection for operating personnel and other persons against electrical shock if they should come in contact with the bus lines or the heating elements.

Figure 3:
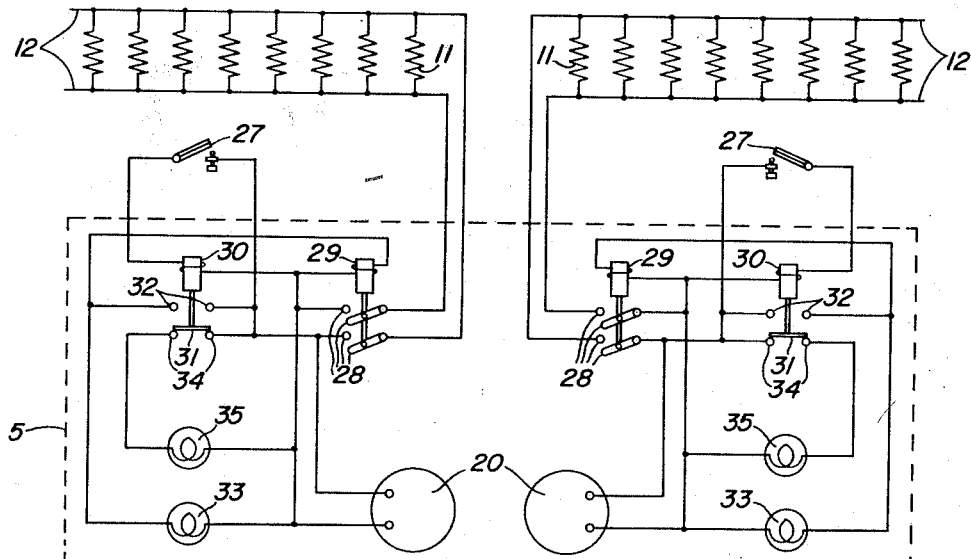
FIG. 3 is a schematic diagram of the major elements of the electrical system utilized in the heating system shown in FIG. 1.
Figure 4:
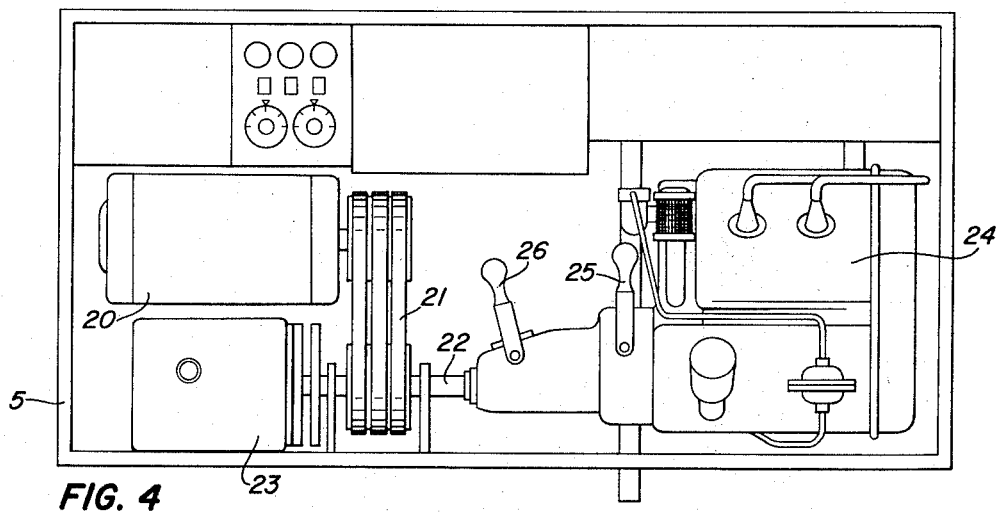
FIG. 4 is a diagrammatic representation of the major control and energizing members of the heating system shown in FIGS. 1 and 3 which are arranged within a housing mounted on the vehicle tank.

In order to provide for the desired energization of the heating elements 11 for maintaining the different sections of the truck body at a predetermined desired temperature under varying conditions, independently of the operation of the vehicle which is adapted to transport the tank body, a separate source of electrical power supply is provided for energizing the heating elements. This source of electrical power supply may comprise a single generator for the entire heating system or, as shown in FIG. 3, may comprise separate generators 20 for each of the different sections of the truck body. These generators 20 may conveniently be driven, as by belts 21, from a shaft 22, which drives a pump 23 for delivering fluid commodities from the interior of the tank body 1. In order to provide for the drive of the generators 20 and the pump 23 independently of the motive power of the vehicle, the drive shaft 22 is adapted to be driven by an auxiliary engine 24 through a suitable clutch which may be controlled by a handle 25 and change speed gearing which may be shifted by a gearshift handle 26. All of this power equipment, including the generators 20, the pump 23, the engine 24 and its interconnecting driving members, preferably is mounted with the control equipment in the cabinet 5, as shown schematically in FIGS. 3 and 4.

The energization of the heating elements 11 by the generators 20 preferably is controlled by an adjustable thermostatic switch 27, of any suitable type, which is located on or in a section of the tank body 1, so that it will open and close an electrical circuit in response to the temperature of the tank or the commodity within the tank. The generators 20 actually are adapted to be electrically connected to the bus lines 12 through contacts 28 of an electromagnetic circuit breaker having an operating coil 29 which is energized and deenergized in response to the closing and opening of the thermostatic switch 27. The contacts of each thermostatic switch 27 are connected across one of the generators 20 adapted to energize the heating elements 11 for its respective section of the tank body in series with a relay operating coil 30, so that when the temperature in its respective section of the tank falls below a predetermined desired value, the thermostatic switch 27 closes and energizes the relay operating coil 30. This energization of the coil 30 actuates a relay contactor 31 to close a circuit through relay contacts 32, so as to close an electrical circuit through the circuit breaker coil 29 to close the contacts 28 of the circuit breaker, which energizes the bus lines 12 and the heating elements 11. Closure of the electrical circuit through the relay contacts 32 also energizes a circuit through an indicating light 33 which shows that the heating elements are energized.

When the temperature of the tank section controlled by a thermostatic switch 27 reaches the predetermined adjusted value, the thermostatic switch 27 opens and deenergizes the relay operating coil 30, so that the relay contactor opens the circuit between the relay contacts 32 and closes a circuit between relay contacts 34. The closure of an electrical circuit through the relay contacts 34 energizes a second indicating light 35. In this manner, whenever the relay contactor 31 is in a position to energize the circuit breaker operating coil 29 so that the circuit breaker is in closed position to energize the heating elements 11, the indicating light 33 is energized, and when the relay operating coil 30 is deenergized by the thermostatic switch 27, the indicating light 35 is energized to indicate that the circuit breaker operating coil 29 is deenergized so as to deenergize the heating elements 11.

Preferably, all of the circuit breakers, relays, and indicating lights are located within the cabinet 5 to provide a compact heating power supply and control assembly which may be conveniently operated, adjusted, and repaired from a single point in the system. In addition, the heating system illustrated in the drawings provides an arrangement for applying heat to a commodity which is being conveyed or stored in the tank by a system which is entirely outside of the tank and which, therefore, will not in any way interfere with or contaminate material within the tank. This exterior arrangement of the heating system also maintains the interior of the tank entirely free of parts of the heating system and thereby facilitates cleaning of the interior of the tank. The arrangement of a large number of heating elements substantially evenly spaced over the entire tank aids in uniformly heating the tank and material within the tank so as to minimize variations due to expansion and contraction of the tank which might adversely affect the mechanical structure of the tank and of the heating system.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

I claim:

1. A heating system for a tank having a tank body formed of a plurality of bays with structural reinforcing members at the adjacent juncture edges of said bays, heating members comprising electrical resistance heating strip elements extending around a portion of each bay in close proximity to the outer surface of the tank body and spaced between said reinforcing members, a source of electric power, circuit breaker means responsive to the temperature in a section of said tank body for connecting said source of electric power to said heating members, means for indicating when said circuit breaker means is energized to closed-circuit position, and means for indicating when said circuit breaker means is deenergized to open-circuit position.

2. A heating system for a tank having a tank body formed of a plurality of bays with structural reinforcing members at the adjacent juncture edges of said bays, electric bus lines extending longitudinally of said tank body through said reinforcing members, insulating means supporting said bus lines in said reinforcing members, heating members comprising a plurality of electrical resistance heating strip elements extending around a portion of each bay in close proximity to the outer surface of the tank body and spaced between said reinforcing members, means connecting said heating elements to said bus lines, insulating tape between said heating elements and said tank body, insulating tape over said heating elements sealed to said first mentioned tape, a source of electric power, circuit breaker means responsive to the temperature in said tank body for connecting said source of electric power to said bus lines, means for indicating when said circuit breaker means is energized to closed-circuit position, and means for indicating when said circuit breaker means is deenergized to open-circuit position.

3. A heating system for a tank having a tank body formed of a plurality of bays with structural reinforcing members at the adjacent juncture edges of said bays, electric bus lines extending longitudinally of said tank body through said reinforcing members, insulating means supporting said bus lines in said reinforcing members, heating members comprising electrical resistance heating elements extending around a portion of each bay in close proximity to the outer surface of the tank body and spaced between said reinforcing members, means connecting said heating elements to said bus lines, a source of electric power, circuit breaker means for connecting said source of electric power to said bus lines, means for indicating when said circuit breaker means is energized to closed-circuit position, means for indicating when said circuit breaker means is deenergized to open-circuit position, means for energizing said circuit breaker for operation thereof to closed-circuit position, adjustable thermostatic means responsive to the temperature in a section of said tank body to close a circuit for energizing said circuit breaker energizing means to energizing position, said circuit breaker energizing means also being constructed and connected for energizing said two circuit breaker position-indicating means respectively in accordance with the energized or deenergized condition thereof.

4. A heating system for a tank having a tank body formed of a plurality of bays with structural reinforcing members at the adjacent juncture edges of said bays, electric bus lines extending longitudinally of said tank body through said reinforcing members, insulating means supporting said bus lines in said reinforcing members, heating members comprising electrical resistance heating elements extending around a portion of each bay in close proximity to the outer surface of the tank body and spaced between said reinforcing members, said heating elements being connected directly to said bus lines, an insulating block between said bus lines and said tank body at each connection of a heating element to said bus lines, said insulating blocks being formed with openings therein, parts of said heating elements extending through said block opening for securing said blocks in position, a source of electric power, circuit breaker means for connecting said source of electric power to said bus lines, means for energizing said circuit breaker for operation thereof to closed-circuit position, and adjustable thermostatic means responsive to the temperature in a section of said tank body to close a circuit for energizing said circuit breaker energizing means to energizing position.

5. A heating system for a tank vehicle having a tank body formed of a plurality of bays with structural reinforcing members at the adjacent juncture edges of said bays, heating members comprising electrical resistance heating strip elements extending around a portion of each bay in close proximity to the outer surface of the tank body and spaced between said reinforcing members, a source of electric power, circuit breaker means for connecting said source of electric power to said heating members, means for indicating when said circuit breaker means is energized to closed-circuit position, means for indicating when said circuit breaker means is deenergized to open-circuit position, means for energizing said circuit breaker for operation thereof to closed-circuit position, and adjustable thermostatic means responsive to the temperature in a section of said tank body to close a circuit for energizing said circuit breaker energizing means to energizing position, said circuit breaker energizing means also being constructed and connected for energizing said two circuit breaker position-indicating means respectively in accordance with the energized or deenergized condition thereof.

References Cited in the file of this patent

UNITED STATES PATENTS

| | | |
|---|---|---|
| 2,036,607 | Robinson | Apr. 7, 1936 |
| 2,157,910 | McCormick | May 9, 1939 |
| 2,185,878 | Adams et al. | Jan. 2, 1940 |
| 2,237,110 | Osterheld | Apr. 1, 1941 |
| 2,433,124 | Johnson | Dec. 23, 1947 |
| 2,510,456 | Biebel | June 6, 1950 |
| 2,908,791 | Torino et al. | Oct. 31, 1957 |

FOREIGN PATENTS

| | | |
|---|---|---|
| 591,085 | Great Britain | Aug. 6, 1947 |